(12) United States Patent
Tanno et al.

(10) Patent No.: US 9,873,289 B2
(45) Date of Patent: Jan. 23, 2018

(54) PNEUMATIC TIRE

(71) Applicant: The Yokohama Rubber Co., LTD., Minato-ku, Tokyo (JP)

(72) Inventors: Atsushi Tanno, Hiratsuka (JP); Noboru Takada, Hiratsuka (JP); Yuji Sato, Hiratsuka (JP); Jun Matsuda, Hiratsuka (JP); Yuji Kodama, Hiratsuka (JP); Susumu Imamiya, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 283 days.

(21) Appl. No.: 14/629,400

(22) Filed: Feb. 23, 2015

(65) Prior Publication Data

US 2015/0165820 A1    Jun. 18, 2015

Related U.S. Application Data

(62) Division of application No. 13/481,720, filed on May 25, 2012, now Pat. No. 8,991,458.

(30) Foreign Application Priority Data

May 27, 2011  (JP) ................................ 2011-119670
May 27, 2011  (JP) ................................ 2011-119672

(51) Int. Cl.
  *B60C 9/18*     (2006.01)
  *B60C 11/00*    (2006.01)
  (Continued)

(52) U.S. Cl.
  CPC .............. *B60C 9/0238* (2013.01); *B60C 9/18* (2013.01); *B60C 9/28* (2013.01); *B60C 11/01* (2013.01);
  (Continued)

(58) Field of Classification Search
  CPC .. B60C 9/00; B60C 9/18; B60C 11/00; B60C 19/12
  See application file for complete search history.

(56) References Cited

U.S. PATENT DOCUMENTS

| 4,111,249 A | 9/1978 | Markow |
| 4,165,403 A * | 8/1979 | Alban ................. B32B 15/06 152/208 |

(Continued)

FOREIGN PATENT DOCUMENTS

| CN | 85107985 | 4/1987 |
| CN | 1830694 | 9/2006 |

OTHER PUBLICATIONS www.engineeringtoolbox.com, no date.*

*Primary Examiner* — Justin Fischer
(74) *Attorney, Agent, or Firm* — Thorpe North & Western

(57) ABSTRACT

A pneumatic tire including: a cylindrical annular structure; a rubber layer, which will become a tread portion, provided along a circumferential direction of the annular structure on an outer side of the annular structure; a carcass portion provided on at least both sides in a width direction of the cylindrical structure including the annular structure and the rubber layer; and an extending portion that extends from both sides in the width direction of the annular structure farther outward in the width direction than a ground contact edge on the outer side in the width direction of the tread portion, and that is provided in plurality on both sides in the width direction along the circumferential direction of the annular structure.

12 Claims, 15 Drawing Sheets

(51) Int. Cl.
*B60C 19/12* (2006.01)
*B60C 9/02* (2006.01)
*B60C 9/28* (2006.01)
*B60C 11/01* (2006.01)

(52) U.S. Cl.
CPC ..... *B60C 2011/0033* (2013.01); *Y02T 10/862* (2013.01); *Y10T 152/1081* (2015.01); *Y10T 152/10765* (2015.01); *Y10T 152/10855* (2015.01); *Y10T 152/10864* (2015.01)

(56) References Cited

U.S. PATENT DOCUMENTS

| | | | |
|---|---|---|---|
| 5,417,266 A * | 5/1995 | Janus | B60C 9/18 152/200 |
| 5,618,362 A * | 4/1997 | Janus | B60C 9/18 152/200 |
| 6,260,593 B1 * | 7/2001 | Spragg | B60C 9/18 152/197 |
| 2006/0201599 A1 | 9/2006 | Tanaka | |

* cited by examiner

PNEUMATIC TIRE

RELATED APPLICATIONS

This application is a divisional of U.S. application Ser. No. 13/481,720 filed on May 25, 2012, which claims priority to Japan Patent Application Serial No. 2011-119670 and 2011-119672 filed on May 27, 2011, which are each incorporated herein by reference.

BACKGROUND

Technical Field

The present technology relates to a pneumatic tire.

Related Art

Reducing the rolling resistance of a pneumatic tire is useful for improving the fuel consumption of a vehicle. Techniques exist for reducing the rolling resistance of a tire such as, for example, using a silica-compounded rubber for the tread.

While the technique for reducing the rolling resistance of pneumatic tires described in Recent Technical Trends in Tires, Akimasa DOI, Journal of the Society of Rubber Industry, September 1998, Vol. 71, p. 588-594 provides an improvement to the material, it is also possible to reduce the rolling resistance and enhance steering stability by modifying the structure of the pneumatic tire. While the technique for reducing the rolling resistance of pneumatic tires described in Recent Technical Trends in Tires, Akimasa DOI, Journal of the Society of Rubber Industry, September 1998, Vol. 71, p. 588-594 provides an improvement to the material, it is also possible to reduce the rolling resistance and ensure cornering power by modifying the structure of the pneumatic tire.

SUMMARY

The present technology reduces the rolling resistance of a pneumatic tire and, furthermore, provides a structure by which steering stability can be enhanced and/or provides a structure by which cornering power can be ensured.

The present technology is a pneumatic tire including: a cylindrical annular structure; a rubber layer, which will become a tread portion, provided along a circumferential direction of the annular structure on an outer side of the annular structure; a carcass portion including fibers covered with rubber, provided on at least both sides in a width direction of the cylindrical structure including the annular structure and the rubber layer; and an extending portion that extends from both sides in the width direction of the annular structure farther outward in the width direction than a ground contact edge on the outer side in the width direction of the tread portion, and that is provided in plurality on both sides in the width direction along the circumferential direction of the annular structure.

In the present technology, the extending portion is preferably disposed along a portion of the carcass portion when viewed as a meridian cross-section.

In the present technology, the pneumatic tire preferably includes: a pair of bead portions including a pair of bead wires on an inner side in a radial direction and on a portion where the tire is attached to the rim of the wheel, and a bead filler disposed on an outer side in the radial direction of the bead portion. The extending portion preferably folds back at an outer side in the width direction of the bead wires and extends to an inner side in the width direction of the bead filler.

In the present technology, a dimension in the circumferential direction of the extending portion at a position where the extending portion contacts the annular structure is preferably not less than a value 1/800 and not more than a value 1/30 of a dimension in the circumferential direction of the annular structure.

The present technology is a pneumatic tire including: a cylindrical annular structure; a rubber layer, which will become a tread portion, provided along a circumferential direction of the annular structure on an outer side of the annular structure; and a carcass portion including fibers covered with rubber, provided on at least both sides in a width direction of the cylindrical structure including the annular structure and the rubber layer. A ratio ta/tb is not less than 0 and not more than 0.7, where to is a smallest thickness of the rubber layer, in a direction orthogonal to a surface on the outer side in the radial direction or to an extended plane of the surface on the outer side in the radial direction of the annular structure, in a first region 10 mm outward in the width direction and 10 mm inward in the width direction centered on an edge on the outer side in the width direction of the annular structure; and tb is a greatest thickness of the rubber layer, in a direction orthogonal to the surface on the outer side in the radial direction of the annular structure, in a second region that is a region more to the inner side in the width direction than the first region.

In the present technology, in a meridian cross-section of the tread portion when the pneumatic tire is inflated to a predetermined air pressure, a contour form of a meridian cross-section of the tread portion preferably comprises an arc, recessed toward an inner side of the pneumatic tire, in a region from an edge of the annular structure on the outer side in the width direction to 15 mm toward the outer side in the width direction.

In the present technology, in a meridian cross-section, a shortest distance from the edge on the outer side in the width direction of the annular structure to the contour of the tread portion is preferably not less than 0.5 mm and not more than 10 mm.

In the present technology, the annular structure is preferably embedded in the rubber layer and is not exposed from a surface on the outer side in the radial direction of the rubber layer.

In the present technology, an outer side of the rubber layer and the outer side of the annular structure, except a groove portion of the rubber layer, are preferably parallel to a center axis.

The present technology achieves a reduction in the rolling resistance of a pneumatic tire and, furthermore, provides a structure by which steering stability can be enhanced and/or provides a structure by which cornering power can be ensured.

BRIEF DESCRIPTION OF THE DRAWINGS

FIG. 11-1 is a perspective view of an annular structure included in the tire according to the second embodiment.

FIG. 11-2 is a plan view of the annular structure included in the tire according to the second embodiment.

FIG. 19-1 is a meridian cross-sectional view illustrating an example where the tire according to the second embodiment is applied to an LT tire.

FIG. 19-2 is a meridian cross-sectional view illustrating an example where the tire according to the second embodiment is applied to an LT tire.

FIG. 19-3 is a meridian cross-sectional view illustrating an example where the tire according to the second embodiment is applied to an LT tire.

FIG. 20-1 is a meridian cross-sectional view illustrating an example where the tire according to the second embodiment is applied to a TB tire.

FIG. 20-2 is a meridian cross-sectional view illustrating an example where the tire according to the second embodiment is applied to a TB tire.

DETAILED DESCRIPTION

Figure 1:
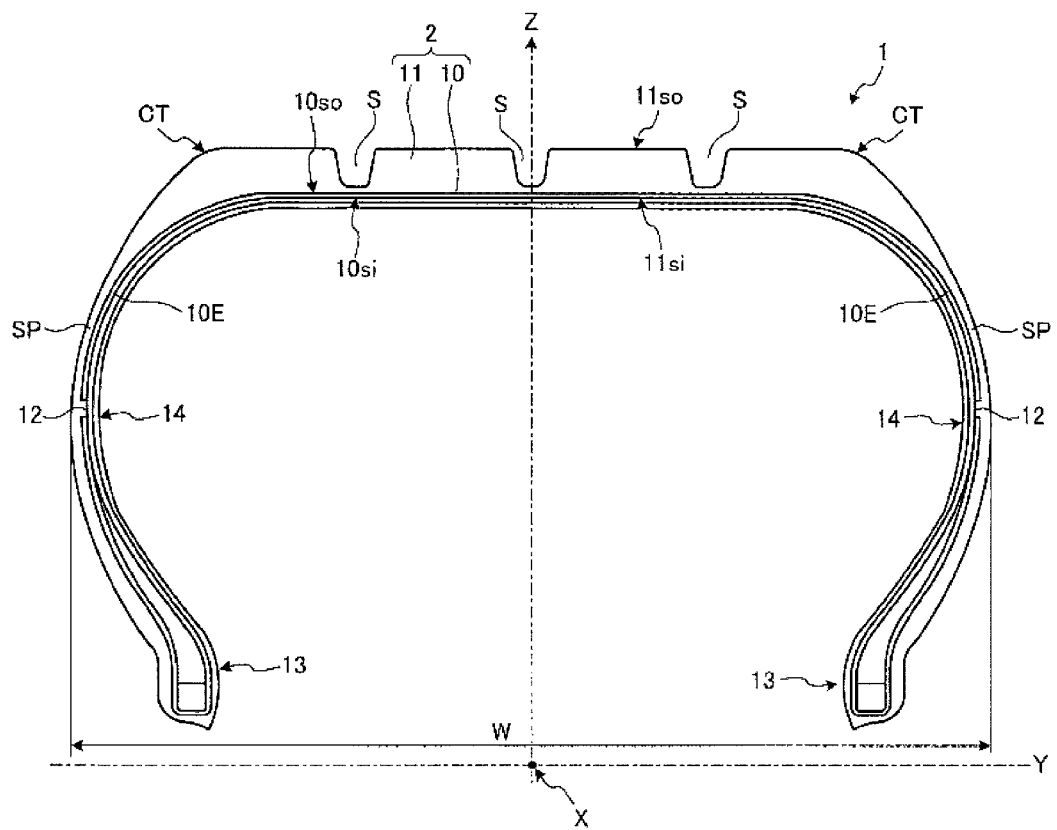
FIG. 1 is a meridian cross-sectional view of a tire according to a first embodiment.

Forms of the present technology (embodiments) are described below in detail while referring to the drawings. However, the present technology is not limited to the descriptions given in the embodiments. Additionally, the constituents described below include those constituents that could be easily conceived by a person skilled in the art, constituents that are essentially identical to those described herein, and constituents that are in an equivalent range thereof. Furthermore, it is possible to combine the constituents described below as desired. Moreover, various omissions, substitutions, and changes of the constituents can be carried out within the scope of the embodiment.

When eccentric deformation is increased to a limit thereof in order to reduce the rolling resistance of a pneumatic tire (hereinafter referred to as "tire" as necessary), ground contact area between the tire and a road surface decreases and ground contact pressure increases. As a result, viscoelastic energy loss, caused by deformations of a tread portion, increases, leading to an increase in rolling resistance. The present inventors focused on this point and attempted to reduce rolling resistance and enhance steering stability by ensuring the ground contact area between the tire and the road surface and maintaining eccentric deformation. Eccentric deformation is a single-dimensional mode of deformation in which a tread ring (crown region) of the tire shifts vertically while the round form of the tire is maintained. In order to ensure the ground contact area between the tire and the road surface and maintain eccentric deformation, the tire according to this embodiment uses, for example, a structure including a cylindrical annular structure that is manufactured from a thin plate of a metal. A rubber layer is provided along a circumferential direction of the annular structure on an outer side of the annular structure. This rubber layer constitutes the tread portion of the tire.

First Embodiment

Figure 2:
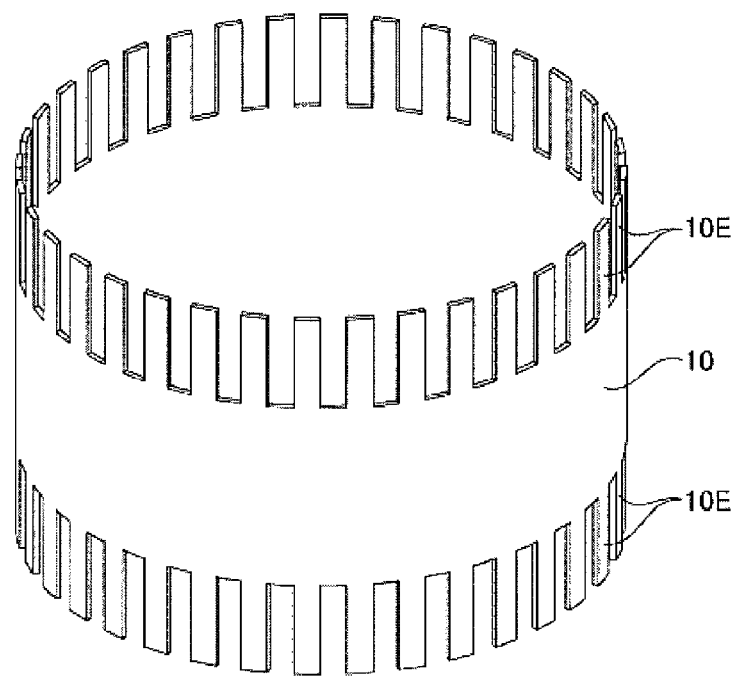
FIG. 2 is a perspective view of an annular structure included in the tire according to the first embodiment.
Figure 3:
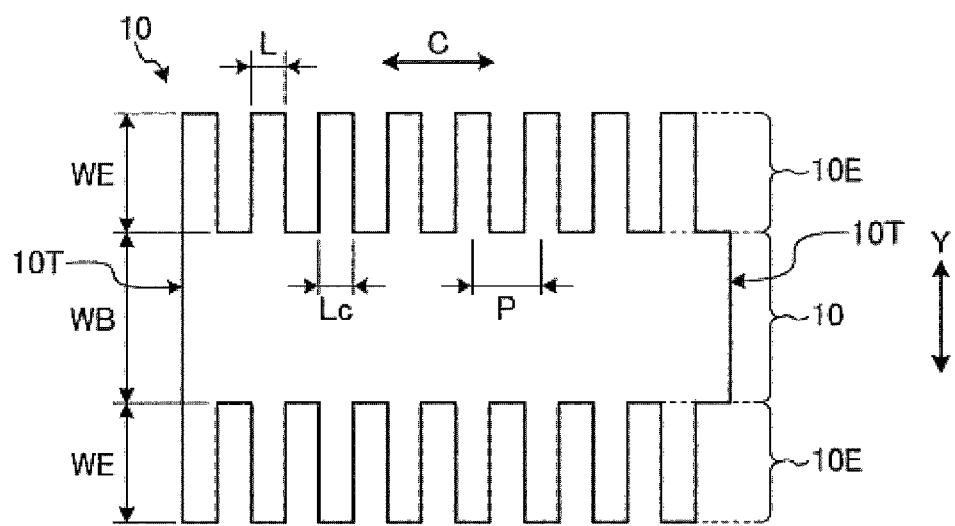
FIG. 3 is a plan view of the annular structure included in the tire according to the first embodiment.

FIG. 1 is a meridian cross-sectional view of a tire according to the first embodiment. FIG. 2 is a perspective view of an annular structure included in the tire according to the first embodiment. FIG. 3 is a plan view of the annular structure included in the tire according to the first embodiment. As illustrated in FIG. 1, the tire 1 is an annular structure. An axis that passes through a center of the annular structure is a center axis (Y-axis) of the tire 1. When in use, an interior of the tire 1 is filled with air.

The tire 1 rotates having the center axis (Y-axis) as a rotational axis. The Y-axis is the center axis and the rotational axis of the tire 1. An X-axis is an axis that is orthogonal to the Y-axis (the center axis (rotational axis) of the tire 1), and is parallel to a road surface that the tire 1 makes ground contact with. A Z-axis is an axis that is orthogonal to the Y-axis and the X-axis. A direction that is parallel to the Y-axis is a width direction of the tire 1. A direction that passes through the Y-axis and is orthogonal to the Y-axis is a radial direction of the tire 1. Additionally, a circumferential direction centered on the Y-axis is a circumferential direction of the pneumatic tire 1.

Figure 4:
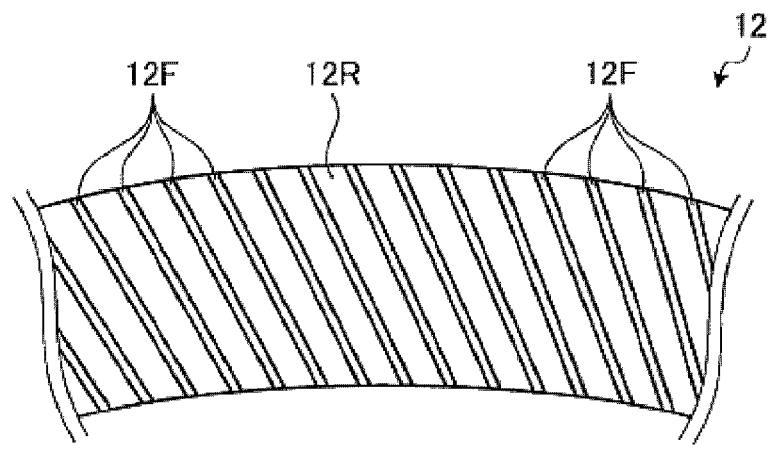
FIG. 4 is an enlarged view of a carcass portion included in the tire according to the first embodiment.

As illustrated in FIG. 1, the tire 1 includes a cylindrical annular structure 10, a rubber layer 11, and a carcass portion 12. The annular structure 10 is a cylindrical member. The rubber layer 11 is provided along the circumferential direction of the annular structure 10 on a surface 10so on the outer side in the radial direction of the annular structure 10, and constitutes the tread portion of the tire 1. As illustrated in FIG. 4, the carcass portion 12 includes fibers 12F covered by rubber 12R. In this embodiment, as illustrated in FIG. 1, the carcass portion 12 is provided on an inner side in the radial direction of the annular structure 10 and connects both bead portions 13. In other words, the carcass portion 12 is continuous between both of the bead portions 13 and 13. Note that while the carcass portion 12 is provided on both sides in the width direction of the annular structure 10, the carcass portion 12 needs not be continuous between both of the bead portions 13 and 13. Thus, as illustrated in FIG. 1, it is sufficient that the carcass portion 12 be provided on both sides in the direction (the width direction) parallel to the center axis (Y-axis) of a cylindrical structure 2 that includes at least the annular structure 10 and the rubber layer 11.

In the tire 1, in a meridian cross-section of the structure 2, an outer side 11so (tread surface of the tire 1) of the rubber layer 11 and the surface 10so on the outer side in the radial direction of the annular structure 10, except portions where a groove S is formed in the tread surface, preferably have the same form, and are parallel (including allowance and tolerance).

The annular structure 10 illustrated in FIGS. 2 and 3 is a metal structure. In other words, the annular structure 10 is made from a metal material. The metal material used for the annular structure 10 preferably has a tensile strength of not less than 450 N/m$^2$ and not more than 2,500 N/m$^2$, more preferably not less than 600 N/m$^2$ and not more than 2,400 N/m$^2$, and even more preferably not less than 800 N/m$^2$ and not more than 2,300 N/m$^2$. When the tensile strength is within the range described above, sufficient strength and rigidity of the annular structure 10 can be ensured, and necessary toughness thereof can be ensured. It is sufficient that the tensile strength of the metal material that can be used for the annular structure 10 be within the range described above, but preferably spring steel, high tensile steel, stainless steel, or titanium (including titanium alloy) is used. Of these, stainless steel is preferable because stainless steel has high corrosion resistance and stainless steel with a tensile strength that is within the range described above can be obtained easily.

A pressure resistance parameter is defined as a product of the tensile strength (MPa) and the thickness (mm) of the annular structure 10. The pressure resistance parameter is a parameter by which resistance against internal pressure of the gas (e.g. air, nitrogen, or the like) that the tire 1 is filled with is measured. The pressure resistance parameter is set to be not less than 200 and not more than 1,700 and preferably not less than 250 and not more than 1,600. When within this range, a maximum usage pressure of the tire 1 can be ensured, and safety can be sufficiently ensured. Additionally, when within the range described above, it is not necessary to increase the thickness of the annular structure 10, and it is also not necessary to use a material with a high breaking strength, which is preferable for mass production. Durability against repeated bending can be ensured for the annular structure 10 because it is not necessary to increase the thickness of the annular structure 10. Additionally, the annular structure 10 and the tire 1 can be manufactured at a low cost because it is not necessary to use a material with a high breaking strength. When used as a passenger car tire (PC tire), the pressure resistance parameter is preferably not less than 200 and not more than 1,000, and more preferably not less than 250 and not more than 950. When used as a light truck tire (LT tire), the pressure resistance parameter is preferably not less than 300 and not more than 1,200, and more preferably not less than 350 and not more than 1,100. When used as a truck/bus tire (TB tire), the pressure resistance parameter is preferably not less than 500 and not more than 1,700, and more preferably not less than 600 and not more than 1,600.

When manufacturing the annular structure 10 from stainless steel, it is preferable to use a JIS (Japanese Industrial Standards) G4303-classified martensitic stainless steel, ferritic stainless steel, austenitic stainless steel, austenitic-ferritic two-phase stainless steel, or precipitation hardening stainless steel. By using such a stainless steel, an annular structure 10 having superior tensile strength and toughness can be obtained. Additionally, of the stainless steels described above, precipitation hardening stainless steel (SUS631 or SUS632J1) is more preferable.

The annular structure 10 has a plurality of through-holes that penetrates an inner circumferential surface and an outer periphery thereof. The rubber layer 11 is attached to the outer side in the radial direction and/or the inner side in the tire radial direction of the annular structure 10. The rubber layer 11 is attached to the annular structure 10 via chemical bonding with the annular structure 10. The through-holes provide an effect of strengthening the physical bond between the annular structure 10 and the rubber layer 11. Therefore, bonding strength with the rubber layer 11 is increased by chemical and physical effects (anchoring effects) and, as a result, the annular structure 10 including the through-holes is reliably affixed to the rubber layer 11. This leads to an enhancement in the durability of the tire 1.

A cross-sectional area of one of the through-holes is preferably not less than 0.1 mm$^2$ and not more than 100 mm$^2$, more preferably not less than 0.12 mm$^2$ and not more than 80 mm$^2$, and even more preferably not less than 0.15 mm$^2$ and not more than 70 mm$^2$. When within this range, unevennesses in the carcass portion 12 are suppressed, and bonding by adhesion, specifically, chemical bonding can be sufficiently used. Furthermore, when within the range described above, the physical effect described above, specifically the anchoring effect, is most effective. Due to these effects, the bond between the annular structure 10 and the rubber layer 11 can be strengthened.

When the annular structure 10 has the through-holes, a form thereof is not limited, but a circular or elliptical form is preferable. Additionally, an equivalent diameter 4×A/C of the through-holes (where C is a circumferential length of the through-holes, and A is the opening area of the through-holes) is preferably not less than 0.5 mm and not more than 10 mm. The through-holes more preferably have a circular form and a diameter of not less than 1.0 mm and not more than 8.0 mm. When within this range, physical and chemical bonding can be used effectively and, therefore, the bond between the annular structure 10 and the rubber layer 11 will be stronger. As described hereinafter, the equivalent diameter or diameter of all of the through-holes needs not be the same.

A sum of the area of the through-holes is preferably not less than 0.5% and not more than 30%, more preferably not less than 1.0% and not more than 20%, and even more preferably not less than 1.5% and not more than 15% of a surface area of the outer side in the radial direction of the annular structure 10. When within this range, strength of the annular structure 10 can be ensured while physical and chemical bonding are used effectively. As a result, the bond between the annular structure 10 and the rubber layer 11 will be stronger and necessary rigidity of the annular structure 10 can be ensured. Note that spacing of the through-holes may be equal or unequal. By using such a configuration, the footprint of the tire 1 can also be controlled.

As illustrated in FIGS. 1, 2, and 3, the annular structure 10 includes an extending portion 10E that extends from both sides in the width direction of the annular structure 10 farther outward in the width direction than a ground contact edge CT on the outer side in the width direction of the tread portion (rubber layer 11), and that is provided in plurality on both sides in the width direction along the circumferential direction of the annular structure 10. In the tire 1, where a thin plate made from metal or the like is formed into a cylinder and used as the annular structure 10, the rolling resistance is reduced. However, because the rigidity of the tread portion increases, the rigidity of a side portion SP and that of the bead portion 13 become unbalanced and, as a result, it is possible that steering stability may decline. The annular structure 10 of the tire 1 includes the extending portion 10E and, therefore, sudden changes in stiffness between the tread portion and the side portion SP can be suppressed and rigidity balance throughout the entire tire 1 can be made appropriate. Additionally, because the tire 1 includes the extending portion 10E, rigidity, particularly rigidity of the side portions can be increased. As a result, steering stability of a vehicle on which the tire 1 is mounted is enhanced. Moreover, the rigidity of the tire 1 can be adjusted and performance of the tire 1 can be adjusted by changing at least one of a dimension L in the circumferential direction (direction indicated by arrow "C" in FIG. 3), a dimension WB in the width direction (direction indicated by arrow "Y" in FIG. 3), an arrangement pitch P, and a form of the extending portion 10E. Note that the extending portion 10E may be embedded in the side portion SP (constituted by two layers).

As illustrated in FIG. 1, the extending portion 10E is disposed along a portion of the carcass portion 12 when viewed as a meridian cross-section. Here, the extending portion 10E preferably generates spring properties in the side portion SP of the tire 1 in the vertical direction, horizontal direction, circumferential direction, and twisting direction, and contacts the carcass portion 12, which is responsible for rigidity. Such a configuration is preferable because the rigidity of the tire 1 will be increased.

A dimension Lc in the circumferential direction or the arrangement pitch P of the extending portion 10E at a position where the extending portion 10E contacts the annular structure 10 is preferably not less than a value 1/800 and not more than a value 1/30 of a dimension in the circumferential direction of the annular structure 10. Within such a divisional range, the rigidity of the tire 1 can be ensured, the annular structure 10 can follow deformations of the tire 1 and a form of the annular structure 10, when the annular structure 10 deforms, will be more circular than polygonal. Therefore, uniformity of the tire 1 can be ensured. The dimension Lc in the circumferential direction at the position where the extending portion 10E contacts the annular structure 10 is more preferably not less than a value 1/200 and not more than a value 1/60 of the dimension in the circumferential direction of the annular structure 10. With such a configuration, the rigidity of the tire 1 can be further increased and uniformity can be ensured. The arrangement pitch P of the extending portion 10E is a spacing at which a plurality of the extending portion 10E is arranged in the circumferential direction, and is a distance between adjacent extending portions 10E. The arrangement pitch P is a value measured between centers of the dimension L of the extending portions 10E in the circumferential direction, in a state where the annular structure 10 is expanded.

The annular structure 10 can be manufactured by abutting short sides 10T of a rectangular plate material having a plurality of the extending portion 10E on the long sides thereof, and then welding; or by abutting short sides 10T of a rectangular plate material having a plurality of the extending portion 10E on the long sides thereof and in which a plurality of through-holes has been punched, and then welding. Thus, the annular structure 10 can be manufactured in a comparatively simple manner. Note that the method for manufacturing the annular structure 10 is not limited to this and, for example, the annular structure 10 may be manufactured by forming a plurality of holes in the outer peripheral portion of a cylinder and, thereafter, milling an interior of the cylinder.

The surface 10so on the outer side in the radial direction of the annular structure 10 and an inner side 11si of the rubber layer 11 are in contact with each other. In this embodiment, the annular structure 10 and the rubber layer 11 are affixed using, for example, an adhesive. As a result of such a structure, force can be transferred mutually between the annular structure 10 and the rubber layer 11. Method of fixing the annular structure 10 to the rubber layer 11 are not limited to adhesives. Additionally, the annular structure 10 preferably is not exposed from the outer side in the radial direction of the rubber layer 11. With such a configuration, releasing of the bonding at the interface between the rubber layer 11 and the annular structure 10 can be suppressed and, thus, the annular structure 10 and the rubber layer 11 can be more reliably bonded. Furthermore, the annular structure 10 may be embedded in the rubber layer 11. In such a case as well, the annular structure 10 and the rubber layer 11 can be more reliably bonded.

The rubber layer 11 includes a rubber material including a synthetic rubber, a natural rubber, or a mixture thereof; and carbon, $SiO_2$ or the like, which is added to the rubber material as a reinforcing material. The rubber layer 11 is an endless belt-like structure. As illustrated in FIG. 1, in this embodiment, the rubber layer 11 has a plurality of grooves (main grooves) S in an outer side 11so. The rubber layer 11 may also have lug grooves in addition to the grooves S.

FIG. 4 is an enlarged view of a carcass portion included in the tire according to the first embodiment. The carcass portion 12 is a strengthening member that, together with the annular structure 10, fulfills a role as a pressure vessel when the tire 1 is filled with air. The carcass portion 12 and the annular structure 10 support the load that acts on the tire 1 due to the internal pressure of the air that fills the interior of the tire 1, and withstand dynamic loads received by the tire 1 during traveling. In this embodiment, an inner liner 14 is provided on an inner side of the carcass portion 12 of the tire 1. The inner liner 14 suppresses the air filling the interior of the tire 1 from leaking Each end of the carcass portion 12 has a bead portion 13 on the inner side thereof in the radial direction. The bead portions 13 mate with a rim of a wheel on which the tire 1 is attached. Note that the carcass portion 12 may mechanically bond with the rim of the wheel.

Figure 5:
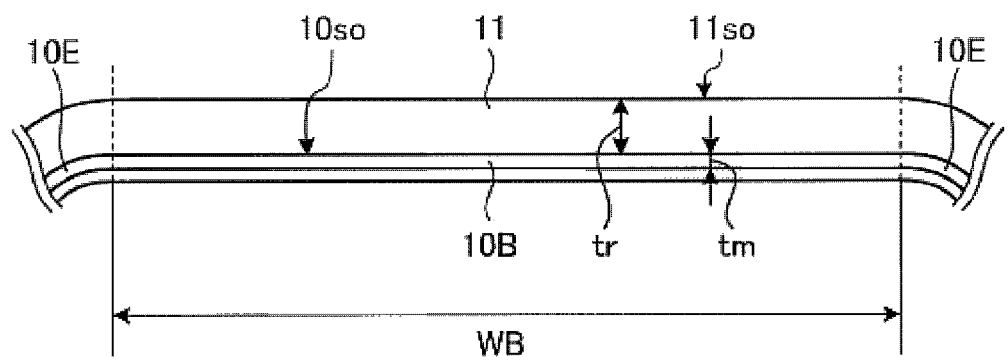
FIG. 5 is a meridian cross-sectional view of the annular structure and a rubber layer.

FIG. 5 is a meridian cross-sectional view of the annular structure 10 and the rubber layer 11. An elastic modulus of the annular structure 10 is preferably not less than 70 GPa and not more than 250 GPa, and more preferably not less than 80 GPa and not more than 230 GPa. Additionally, a thickness tm of the annular structure 10 is preferably not less than 0.1 mm and not more than 0.8 mm. When within this range, durability against repeated bending can be ensured while ensuring pressure resistance performance. A product of the elastic modulus and the thickness tm of the annular structure 10 (referred to as the "rigidity parameter") is preferably not less than 10 and not more than 500, and more preferably not less than 15 and not more than 400.

By configuring the rigidity parameter to be within the range described above, rigidity of the annular structure 10 in the meridian cross-section increases. As a result, when the tire 1 is filled with air and when the tire 1 makes ground contact with a road surface, deformations caused by the annular structure 10 in the meridian cross-section of the rubber layer 11 (tread portion) are suppressed. Therefore, viscoelastic energy loss of the tire 1 caused by the deformations is suppressed. Additionally, by configuring the rigidity parameter to be within the range described above, rigidity of the annular structure 10 in the radial direction decreases. As a result, the tread portion of the tire 1 pliably deforms at a ground contact portion between the tire 1 and the road surface, just as with conventional pneumatic tires. Due to such a function, the tire 1 eccentrically deforms while localized concentrations of strain and stress in the ground contact portion are avoided and, therefore, strain in the ground contact portion can be dispersed. Therefore, localized deformation of the rubber layer 11 in the ground contact portion is suppressed, resulting in ground contact area of the tire 1 being ensured and rolling resistance being reduced.

Furthermore, with the tire 1, the in-plane rigidity of the annular structure 10 is great and the ground contact area of the rubber layer 11 can be ensured. Therefore, ground contact length in the circumferential direction can be ensured. This results in an increase in lateral forces that are generated when a rudder angle is input to the tire 1. As a result, the tire 1 can obtain high cornering power. Additionally, when the annular structure 10 is manufactured from a metal, most of the air that the interior of the tire 1 is filled with will not pass through the annular structure 10. This is beneficial as it simplifies managing the air pressure of the tire 1. Therefore, declines in the air pressure of the tire 1 can be suppressed even when usage of the tire 1 is such that the tire 1 is not filled with air for an extended period of time.

A distance tr (thickness of the rubber layer 11) between the surface 10so on the outer side in the radial direction of the annular structure 10 and the outer side 11so of the rubber layer 11 is preferably not less than 3 mm and not more than 20 mm. By configuring the distance tr to be within such a range, excessive deformation of the rubber layer 11 when cornering can be suppressed while ensuring riding comfort. The direction parallel to the center axis (Y-axis) of the annular structure 10 or, in other words, a dimension WB (annular structure width) in the width direction of the annular structure 10, that is, a dimension of a portion not including the extending portion 10E, is preferably not less than 50% (W×0.5) and not more than 95% (W×0.95) of the total width W (in a state where the tire 1 is assembled on a wheel having a JATMA stipulated rim width and inflated with air to 300 kPa) in the direction parallel to the center axis (Y-axis) of the tire 1 illustrated in FIG. 1. If WB is less than W×0.5, rigidity in the meridian cross-section of the annular structure 10 will be insufficient, resulting in a reduction of the region that maintains eccentric deformation with respect to the tire width. As a result, the effect of reducing rolling resistance may decline and cornering power may decrease. Moreover, if WB exceeds W×0.95, the tread portion may cause buckling deformation in the center axis (Y-axis) direction of the annular structure 10 when making ground contact, and this may lead to the deformation of the annular structure 10. By configuring WB so that W×0.5<WB<W×0.95, cornering power can be maintained while rolling resistance is reduced and, furthermore, deformation of the annular structure 10 can be suppressed.

A length between edges of both the extending portions 10E, 10E in the tire width direction (the length of WE+WB+WE in FIG. 3) is preferably not less than 105% and not more than 200%, and more preferably not less than 110% and not more than 150% of a ground contact width of the tire 1. In this case, the ground contact width of the tire 1 is measured in a state where the tire 1 is inflated to an air pressure of 200 kPa and loaded with the maximum load at 200 kPa shown in the air pressure-load capacity correspondence table specified by JATMA.

With the tire 1, in the meridian cross-section illustrated in FIG. 1, the outer side 11so of the rubber layer 11 or, in other words, the profile of the tread surface, except the portions where the groove S is formed, preferably has the same form as the surface 10so on the outer side in the radial direction of the annular structure 10. As a result of such a configuration, when the tire 1 makes ground contact or is rolling, the rubber layer 11 (tread portion) and the annular structure 10 deform in substantially the same manner. Therefore, deformation of the rubber layer 11 of the tire 1 is reduced, and this leads to a reduction in viscoelastic energy loss and a further reduction in rolling resistance.

If the outer side 11so of the rubber layer 11 and the surface 10so on the outer side in the radial direction of the annular structure 10 protrude facing outward in the radial direction of the tire 1 or, alternately protrude facing inward in the radial direction of the tire 1, pressure distribution in the ground contact portion of the tire 1 will become uneven. As a result, localized concentrations of strain and stress may be generated in the ground contact portion, and localized deformation of the rubber layer 11 may occur in the ground contact portion. In this embodiment, in tire 1, as illustrated in FIG. 5, the outer side 11so of the rubber layer 11 (the tread surface of the tire 1) and the surface 10so on the outer side in the radial direction of the annular structure 10 have the same form (preferably parallel) and, furthermore, preferably are parallel (including allowance and tolerance) to the center axis (Y-axis) of the rubber layer 11 and the annular structure 10 (i.e. the structure 2). Due to such a structure, the ground contact portion of the tire 1 can be configured to be substantially flat. With the tire 1, pressure distribution in the ground contact portion is uniform and, therefore, localized concentration of strain and stress in the ground contact portion is suppressed and localized deformation of the rubber layer 11 in the ground contact portion is suppressed. As a result, viscoelastic energy loss is reduced and, therefore, rolling resistance of the tire 1 is also reduced. Additionally, with the tire 1, localized deformation of the rubber layer 11 in the ground contact portion is suppressed and, therefore, the ground contact area can be ensured and, simultaneously, the ground contact length in the tire circumferential direction can be ensured. Therefore, with the tire 1, cornering power can also be ensured.

In this embodiment, the form of the rubber layer 11 in the meridian cross-section is not particularly limited provided that the outer side 11so of the rubber layer 11 and the surface 10so on the outer side in the radial direction of the annular structure 10 are parallel to the center axis (Y-axis). For example, the form of the rubber layer 11 in a meridian cross-section may be a trapezoidal shape or a parallelogram shape. When the form of the rubber layer 11 in the meridian cross-section is trapezoidal, an upper bottom or a lower bottom of the trapezoid may be the outer side 11so of the rubber layer 11. In either case, it is sufficient that only the portion of the annular structure 10 be parallel to the profile (except the portions where the groove is formed) of the tread surface of the tire 1. Next, the form of the tread surface of the tire 1 will be described in further detail.

Figure 6:
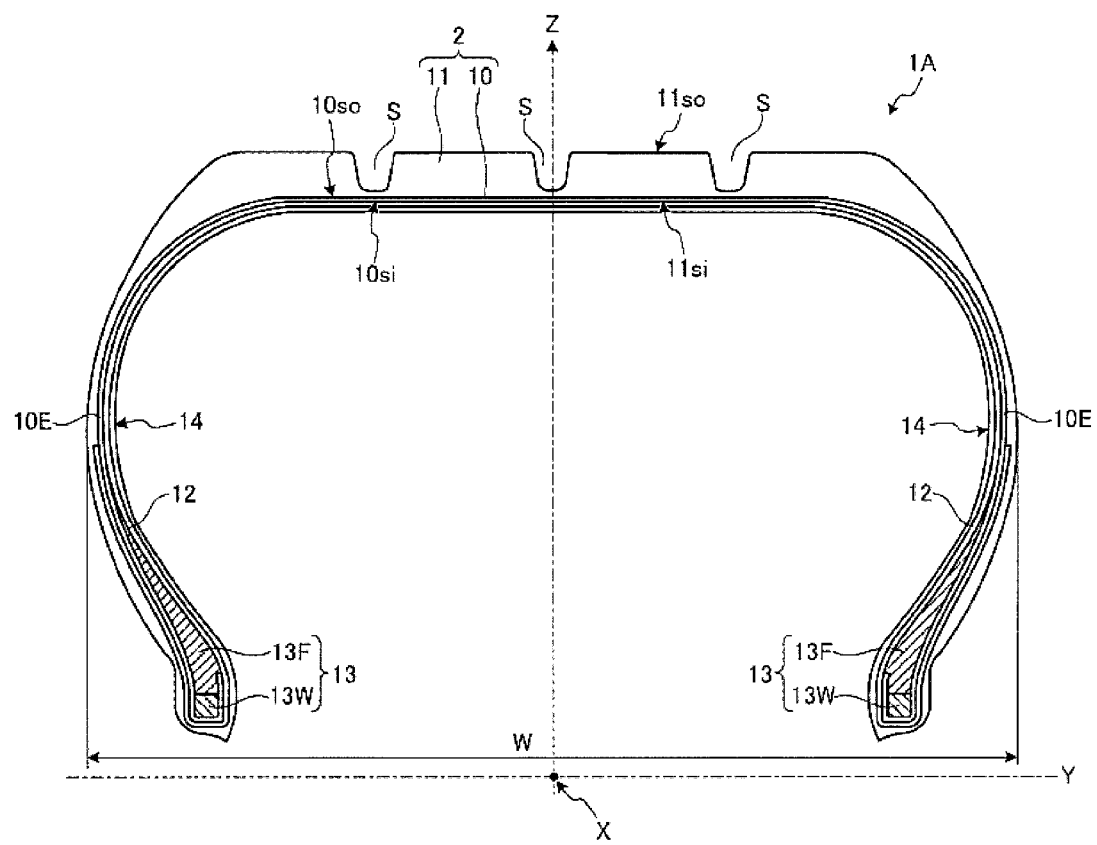
FIG. 6 is a meridian cross-sectional view of a tire according to a modified example of the first embodiment.

FIG. 6 is a meridian cross-sectional view of a tire according to a modified example of the first embodiment. This pneumatic tire 1A includes a pair of bead portions 13 including a pair of bead wires 13W on an inner side in a radial direction and on a portion where the tire is attached to the rim of the wheel, and a bead filler 13F disposed on an outer side in the radial direction of the bead portions 13. The extending portion 10E folds back at an outer side in the width direction of the bead wires 13W and extends to an inner side in the width direction of the bead filler 13F. With such a configuration, the extending portion 10E is strongly fixed by the bead wires 13W and the bead filler 13F, and the rubber on the outer side of these constituents. Therefore, the rigidity of the tire 1A is further increased. Note that rigidity increasing effects can be obtained, as long as the edge of the extending portion 10E is disposed on at least an inner side in the radial direction of the bead wires 13W.

Figure 7:
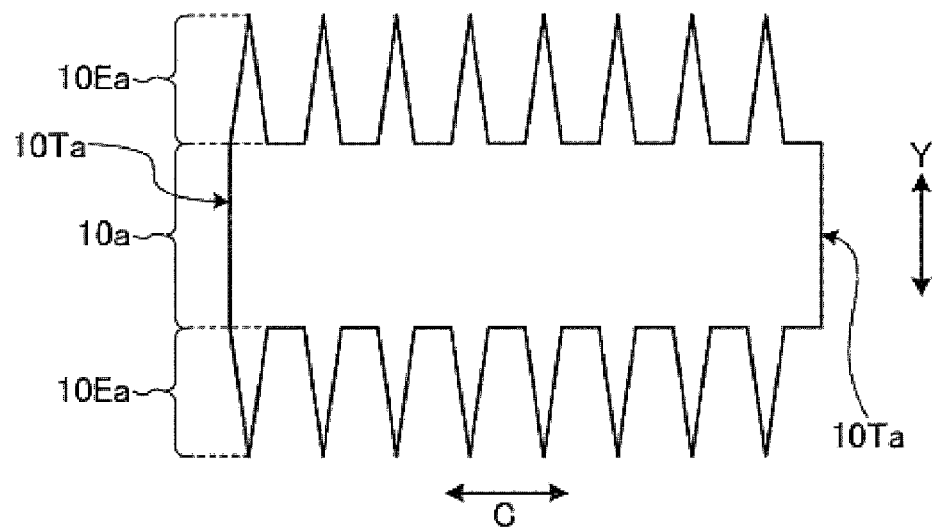
FIG. 7 is a plan view of the annular structure including an extending portion according to a modified example of the first embodiment.
Figure 8:
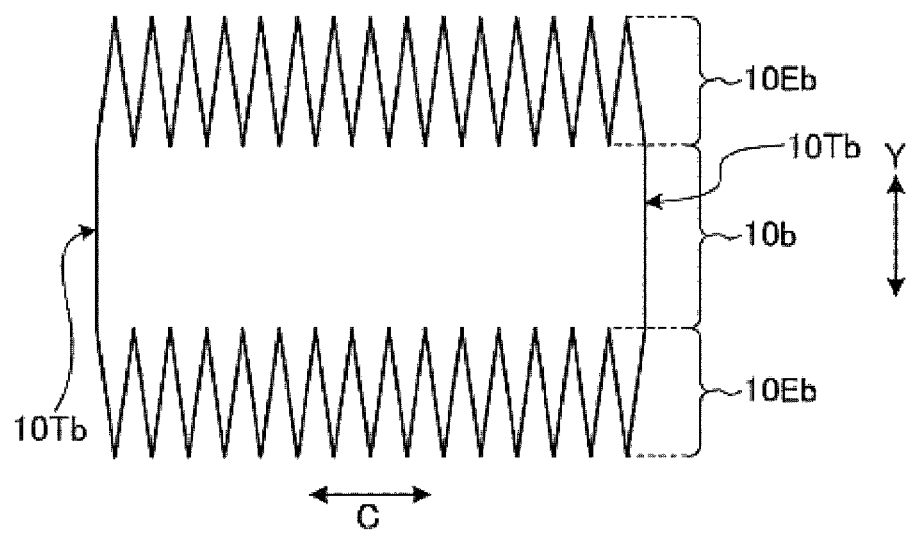
FIG. 8 is a plan view of the annular structure including an extending portion according to a modified example of the first embodiment.
Figure 9:
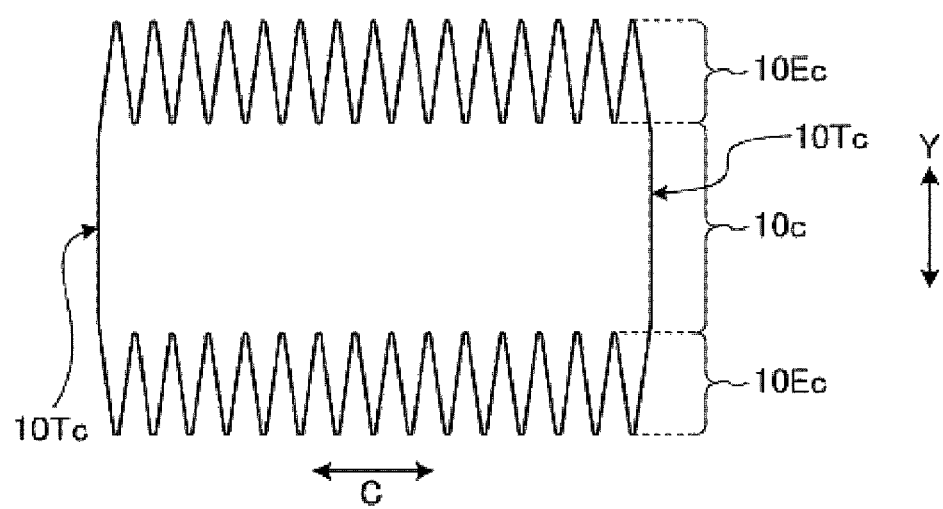
FIG. 9 is a plan view of the annular structure including an extending portion according to a modified example of the first embodiment.

FIGS. 7 to 9 are plan views of the annular structure including an extending portion according to modified examples of the first embodiment. An annular structure 10a illustrated in FIG. 7 has the same structure as the annular structure 10 illustrated in FIG. 3, but a form of an extending portion 10Ea differs in that a dimension in the circumferential direction decreases toward the outer side in the width direction. In other words, the extending portion 10Ea included in the annular structure 10a is triangular and a single peak thereof is facing outward in the width direction. The annular structure 10a is manufactured by abutting short sides 10Ta and then welding. By configuring the dimension in the circumferential direction of the extending portion 10Ea to decrease toward the outer side in the width direction as in the annular structure 10a, interference on the outer side in the width direction of adjacent extending portions 10Ea can be avoided when the short sides 10Ta are joined and formed into a cylinder.

An annular structure 10b illustrated in FIG. 8 has the same structure as the annular structure 10a illustrated in FIG. 7, but differs in that adjacent extending portions 1Eb are disposed without spacing on a portion where the plurality of extending portions 10Eb and the annular structure 10b are joined. With such a configuration, the number of the extending portions 10Eb can be increased. Thus, if the annular structure 10b is used in the tire 1 or 1A, the rigidity of the tire 1 or 1A can be further increased. An annular structure 10c illustrated in FIG. 9 has the same structure as the annular structure 10b illustrated in FIG. 8, but differs in that the outer side in the width direction of the extending portion 10Ec and the portion where the plurality of extending portions 10Ec and the annular structure 10c are joined have an arc form. With such a configuration, cracking of the rubber that contacts the portion on the outer side in the width direction of the extending portion 10Ec can be suppressed and stress concentration at the portion where the plurality of extending portions 10Ec and the annular structure 10c are joined can be mitigated. As a result, if the annular structure 10c is used in the tire 1 or 1A, the durability of the tire 1 or 1A can be further enhanced.

Second Embodiment

With the second embodiment, it is possible to reduce the rolling resistance and also ensure cornering power by modifying the structure of the pneumatic tire. A main object of the present technology is to provide a structure by which the rolling resistance of a pneumatic tire can be reduced and cornering power can be ensured.

Figure 10:
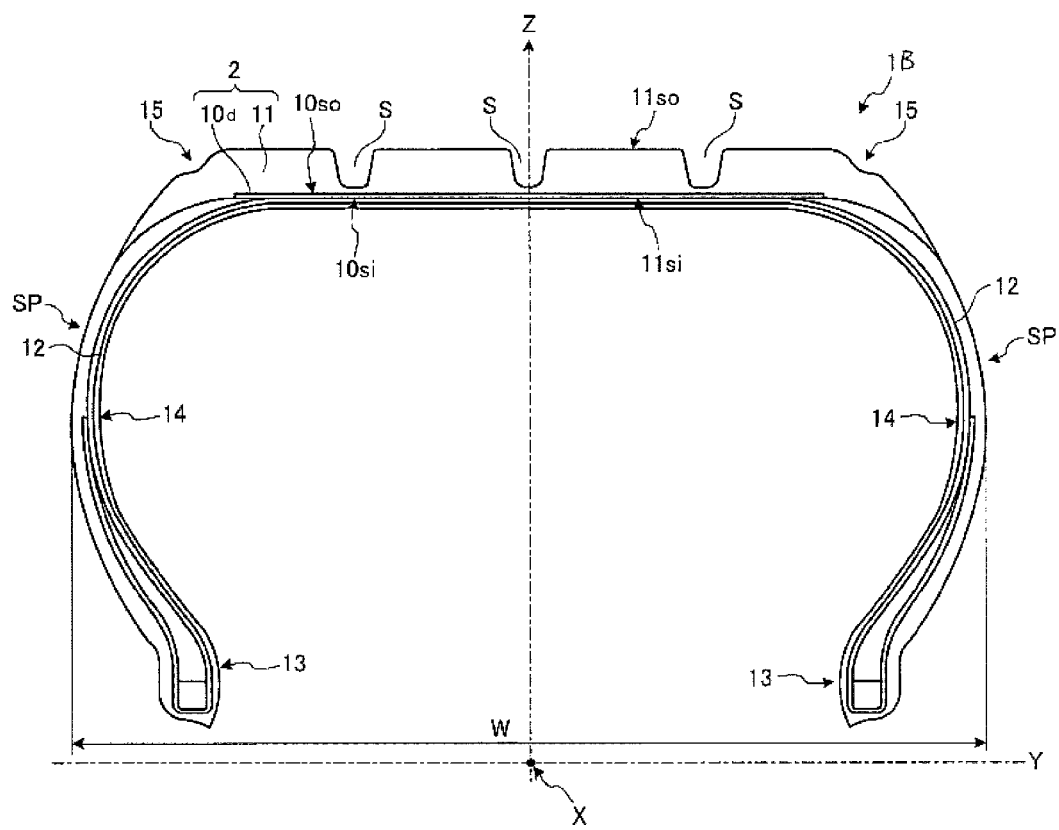
FIG. 10 is a meridian cross-sectional view of a tire according to a second embodiment.
Figures 1, 11:
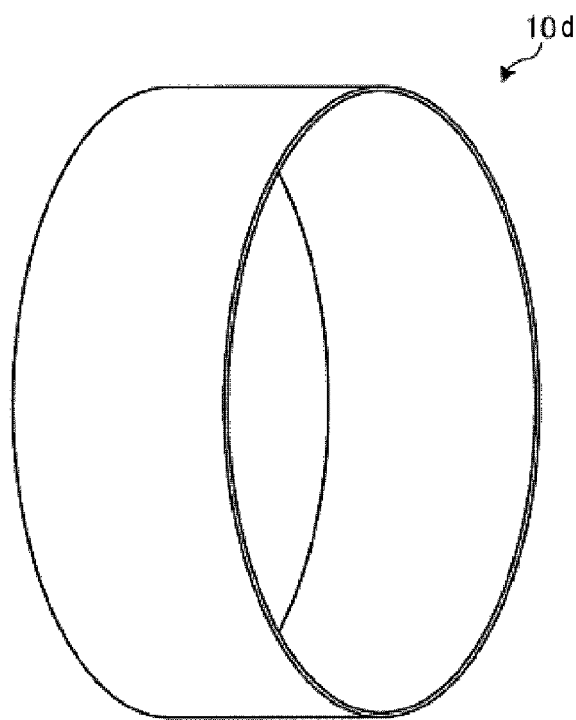
Figures 2, 11:
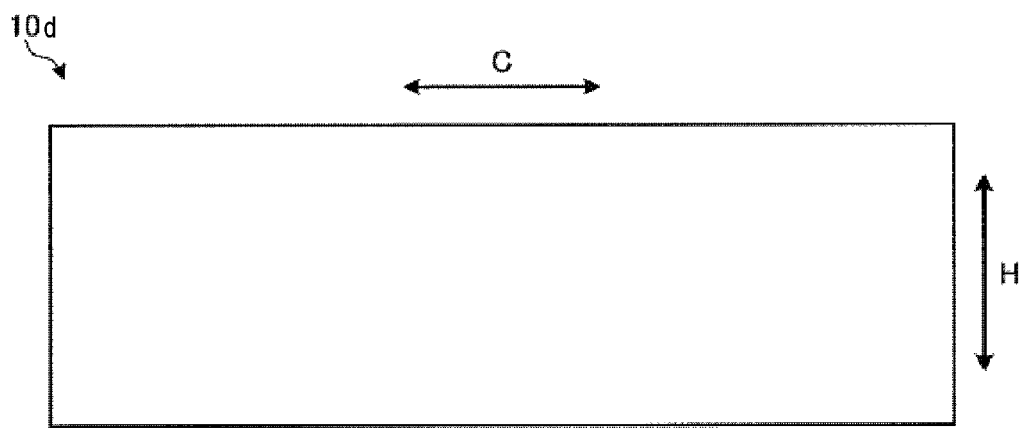

FIG. 10 is a meridian cross-sectional view of a tire according to the second embodiment. FIG. 11-1 is a perspective view of an annular structure included in the tire according to the second embodiment. FIG. 11-2 is a plan view of the annular structure included in the tire according to the second embodiment. As illustrated in FIG. 10, a tire 1B has the same structure as the tire 1 of the first embodiment, but the form of the tread surface and an annular structure 10d are different.

In this embodiment, when viewed as a meridian cross-section, a form of a tread surface of the tire 1B at the outer side in the width direction (specifically, between the contact patch of the rubber layer 11 and a side portion SP of the tire 1B) is recessed toward the inner side of the tire 1B. That is, in the tire 1B, thickness of the rubber layer 11 on the outer side in the width direction is less than that on the inner side in the width direction. By configuring the form of the tread surface and the rubber layer 11 of the tire 1B as described above cornering power can be ensured while reducing rolling resistance.

The annular structure 10d illustrated in FIGS. 11-1 and 11-2 is a metal structure. This annular structure 10d does not have the extending portions 10E, 10Ea, or the like illustrated in FIGS. 1, 2, and the like but may include the extending portions 10E or 10Ea. If the annular structure 10d includes the extending portion 10E, 10Ea, or the like, the rolling resistance of the pneumatic tire 1B will be reduced and, furthermore, a structure can be provided by which steering stability can be enhanced and a structure can be provided by which cornering power can be ensured. The material, tensile strength, pressure resistance parameter, elastic modulus, rigidity parameter, through-hole, and the like of the annular structure 10d are the same as those described in the first embodiment. Additionally, the method of fixing the annular structure 10d to the rubber layer 11, and the material, grooves, and the like of the rubber layer 11 are also the same as those described in the first embodiment. Next, the form of the tread surface of the tire 1 will be described in further detail.

Figure 12:
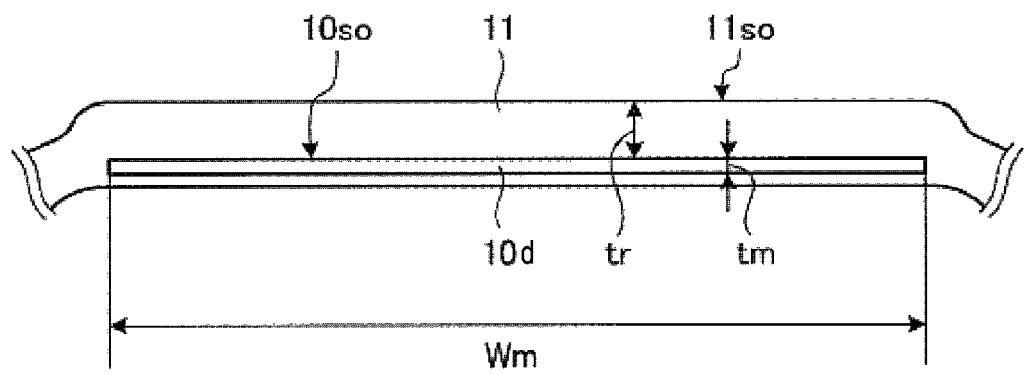
FIG. 12 is an enlarged view of a carcass portion included in the tire according to the second embodiment.
Figure 13:
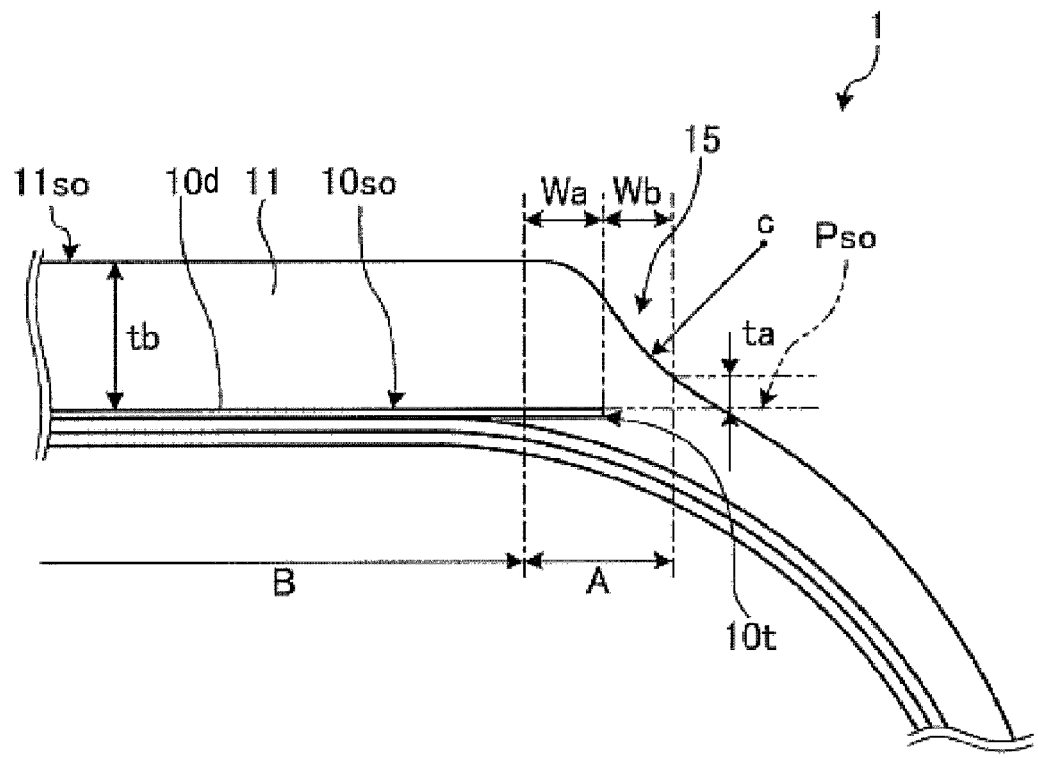
FIG. 13 is a meridian cross-sectional view illustrating an outer side edge in the width direction of the tire according to the second embodiment.
Figure 14:
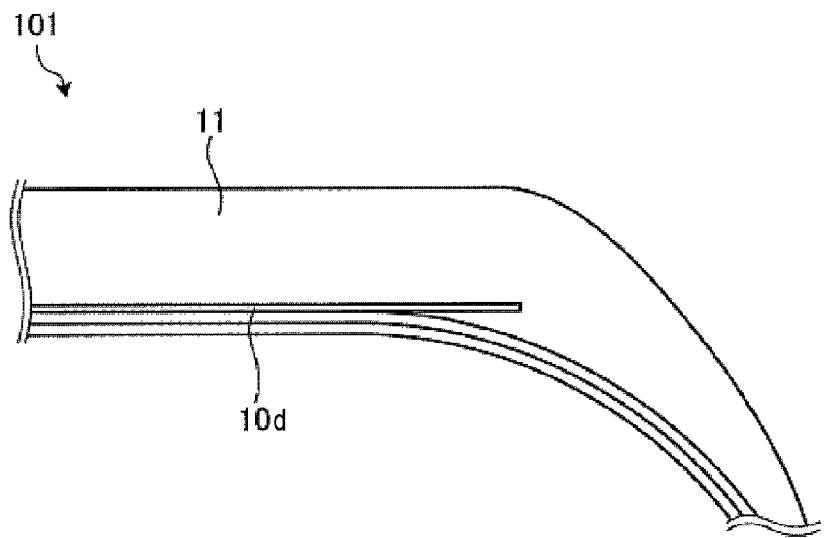
FIG. 14 is a meridian cross-sectional view illustrating an outer side edge in the width direction of the tire according to a Comparative Example.
Figure 15:
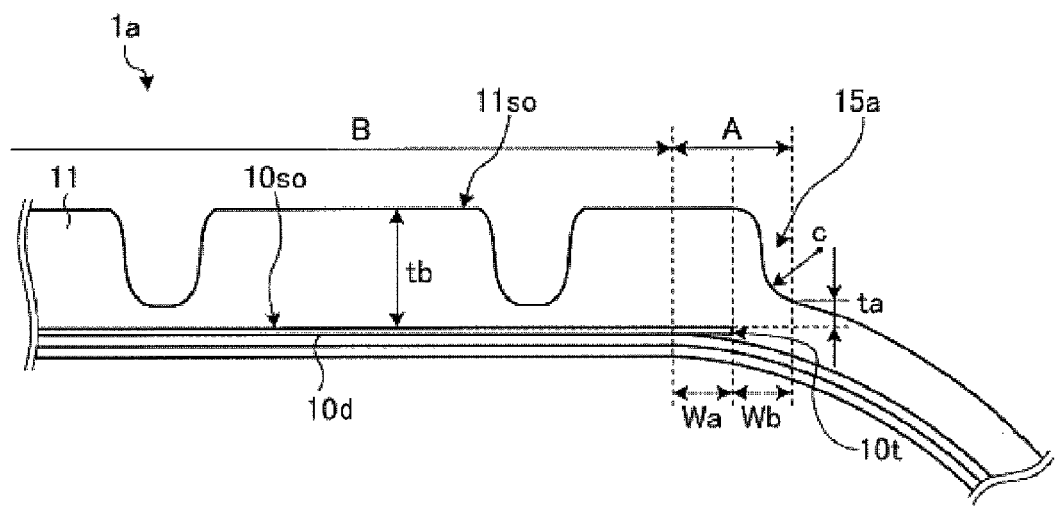
FIG. 15 is a meridian cross-sectional view illustrating an outer side edge in the width direction of the tire according to another example of the second embodiment.
Figure 16:
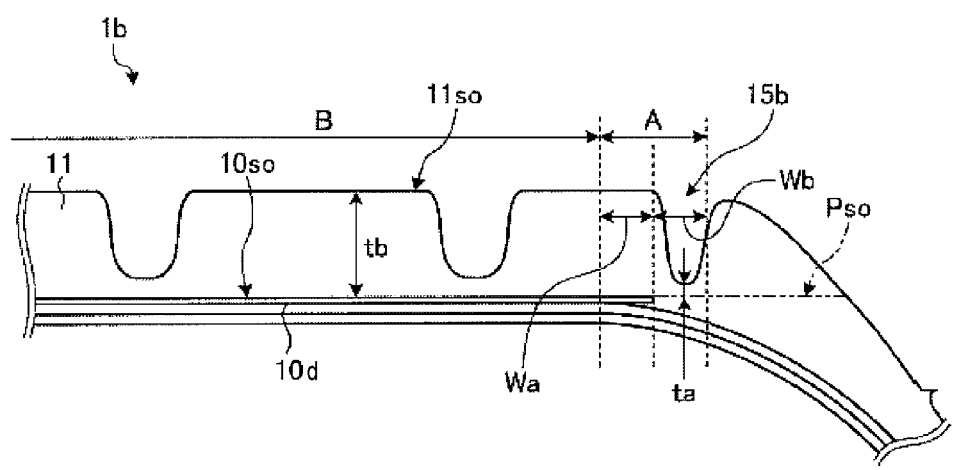
FIG. 16 is a meridian cross-sectional view illustrating an outer side edge in the width direction of the tire according to another example of the second embodiment.

FIG. 12 is a meridian cross-sectional view of the annular structure 10d and the rubber layer 11. FIG. 13 is a meridian cross-sectional view illustrating an outer side edge in the width direction of a tire according to the second embodiment. FIG. 14 is a meridian cross-sectional view illustrating an outer side edge in the width direction of a tire according to a Comparative Example. FIGS. 15 and 16 are meridian cross-sectional views illustrating an outer side edge in the width direction of a tire according to another example of this embodiment. In the tire 1B, a ratio ta/tb is not less than 0 and not more than 0.7. In the ratio ta/tb, to is a smallest thickness of the rubber layer 11, in a direction orthogonal to a surface 10so on the outer side in the radial direction or to an extended plane Pso of the surface 10so on the outer side in the radial direction of the annular structure 10d, in a first region A that is a predetermined distance Wa (5 mm in this embodiment) inward in the width direction and a predetermined distance Wb (5 mm in this embodiment) outward in the width direction centered on an edge 10t on the outer side in the width direction of the annular structure 10d; and tb is a greatest thickness of the rubber layer 11, in a direction orthogonal to the surface 10so on the outer side in the radial direction of the annular structure 10d, in a second region B that is a region more to the inner side in the width direction than the first region A. The ratio ta/tb is more preferably not less than 0.1 and not more than 0.5. In cases where the tire 1B is a PC tire or an LT tire, both Wa and Wb are preferably 5 mm. Additionally, in cases where the tire 1B is a heavy duty tire such as a TB tire, both Wa and Wb may be 10 mm.

A tire 101 using the annular structure 10d (the tire according to the Comparative Example) has significantly reduced rolling resistance. However, because strain in the rubber layer 11 (the tread rubber) is concentrated in the vicinity of the edge of the annular structure 10d in the width direction, the contact length in the ground contact edge portion tends to become longer. Thus, there is room for further improvement with regards to cornering power. In this embodiment, by configuring the ratio ta/tb to be not less than 0 and not more than 0.7 and more preferably not less than 0.1 and not more than 0.5, the thickness of the rubber layer 11 in the vicinity of the edge of the annular structure 10 in the width direction is reduced (the gauge is made thinner). As a result, cornering power can be ensured while reducing rolling resistance.

Provided that the ratio ta/tb is within the range described above, the thickness of the rubber layer 11 at the ground contact edge may be suddenly reduced, as with the tire 1a illustrated in FIG. 15. Additionally, provided that the ratio ta/tb is within the range described above, the rubber layer 11 may include a groove 15b at the ground contact edge, as with the tire 1B illustrated in FIG. 16. In this case, the smallest thickness to of the rubber layer 11 is a distance from a groove bottom of the groove 15b to the surface 10so on the outer side in the radial direction or the extended plane Pso of the surface 10so on the outer side in the radial direction of the annular structure 10d, in a direction orthogonal to a surface 10so on the outer side in the radial direction or to an extended plane Pso of the surface 10so on the outer side in the radial direction of the annular structure 10d.

In a meridian cross-section of the tread portion when the tire 1B is inflated to a predetermined air pressure, a contour form of the tire 1B includes an arc 15, recessed toward an inner side of the tire 1B, in a region from an edge 10t of the annular structure 10d on an outer side in the width direction to 15 mm toward the outer side in the width direction. The arc 15 has a center c on the outer side in the radial direction and the outer side in the width direction of the tire 1B. A curvature radius of the arc 15 is preferably not less than 3 mm and not more than 150 mm, more preferably not less than 5 mm and not more than 100 mm, and most preferably not less than 8 mm and not more than 70 mm. When configured as described above, an amount of rubber of the end portion on the outer side in the width direction of the annular structure 10d will be appropriate and, thus, greater cornering power can be ensured. The predetermined air pressure is an air pressure measured when the tire 1, 1a, or 1c is assembled on a wheel having a rim width stipulated in JATMA, and is 300 kPa.

Figure 17:
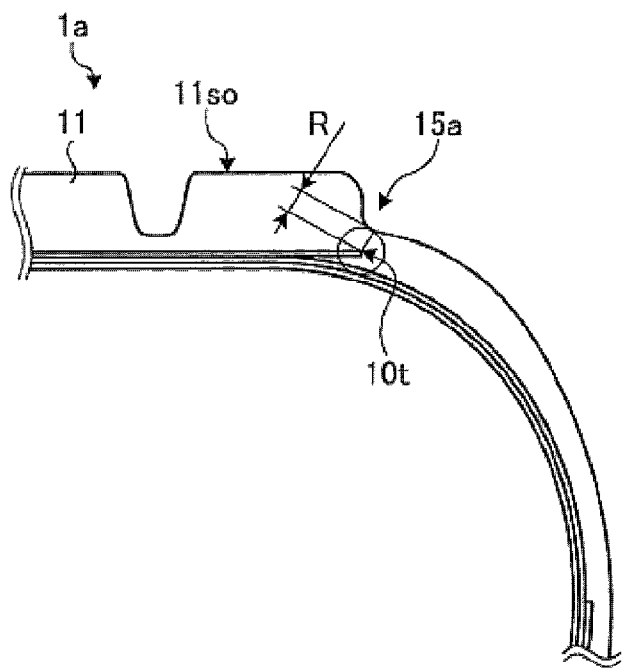
FIG. 17 is a meridian cross-sectional view illustrating an outer side edge in the width direction of the tire according to the second embodiment.
Figure 18:
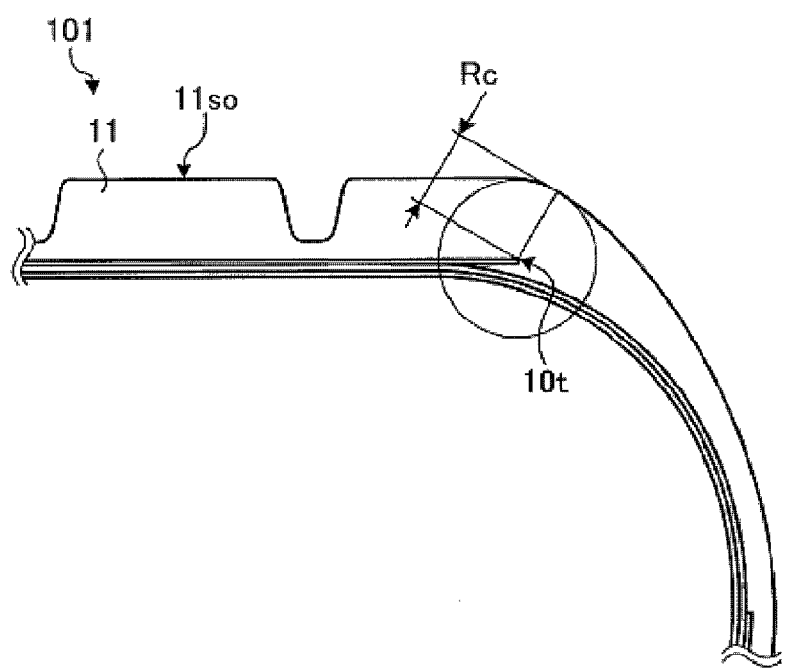
FIG. 18 is a meridian cross-sectional view illustrating an outer side edge in the width direction of the tire according to the Comparative Example.

FIG. 17 is a meridian cross-sectional view illustrating an outer side edge in the width direction of a tire according to the second embodiment. FIG. 18 is a meridian cross-sectional view illustrating an outer side edge in the width direction of a tire according to a Comparative Example. In this embodiment, in cases where the tire 1 a is a PC tire, in a meridian cross-section, a shortest distance R from the edge 10t on the outer side in the width direction of the annular structure 10d to the contour of the tread portion (excluding lug grooves) is preferably not less than 0.5 mm and not more than 5 mm. Additionally, in cases where the tire 1a is a heavy duty tire, in a meridian cross-section, the shortest distance R from the edge 10t on the outer side in the width direction of the annular structure 10d to the contour of the tread portion (excluding lug grooves) is preferably not less than 0.5 mm and not more than 10 mm. When configured as described above, an amount of rubber of the end portion on the outer side in the width direction of the annular structure 10d will be appropriate and, thus, greater cornering power can be ensured. The same is true for the tire 1 illustrated in FIG. 5 and the tire 1b. Illustrated in FIG. 16 with regards to the shortest distance R. Note that with the tire 101 of the Comparative Example illustrated in FIG. 18, in a meridian cross-section, a shortest distance RFC from the edge 10t on the outer side in the width direction of the annular structure 10d to the contour of the tread portion (excluding lug grooves) is outside the range described above. As a result, with the tire 101 of the Comparative Example, a reduction in rolling resistance can be realized, but cornering power is less than that realized with the tires 1, 1a, and 1b of the embodiments.

Figures 1, 19:
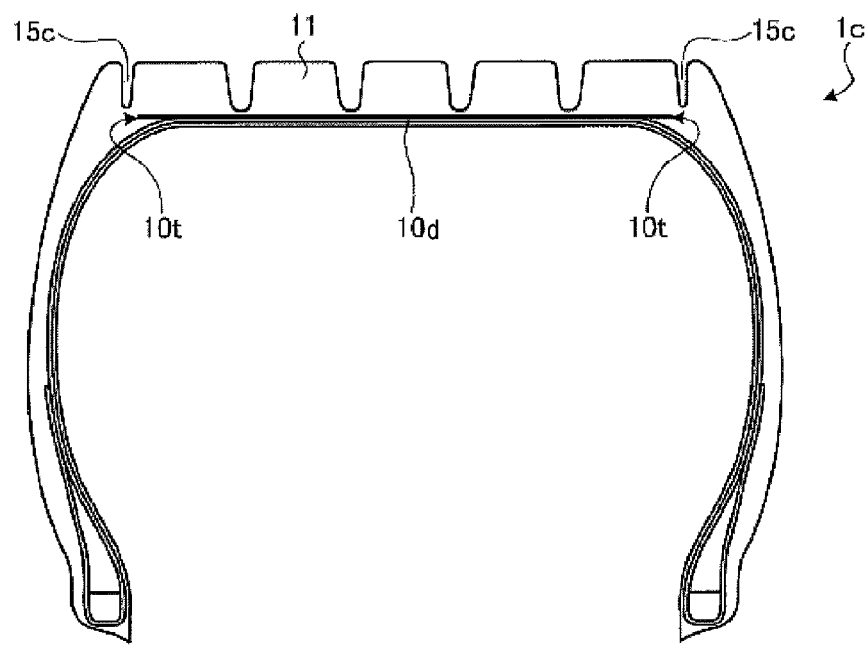
Figures 2, 19:
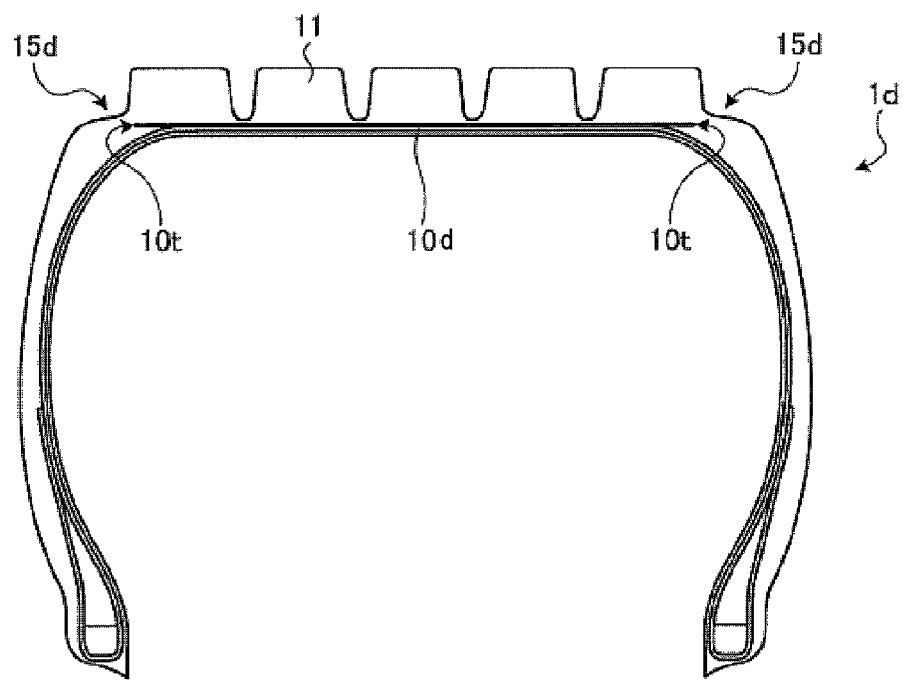
Figures 3, 19:
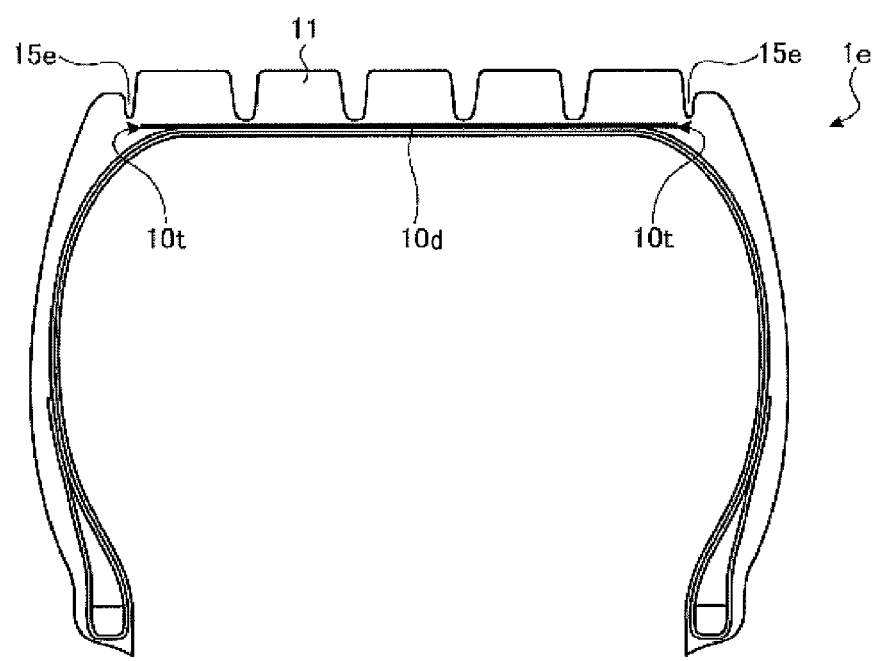

FIGS. 19-1 to 19-3 are meridian cross-sectional views illustrating examples where the tire according to the second embodiment is applied to an LT tire. A tire 1c illustrated in FIG. 19-1 has a groove 15c in the rubber layer 11 in the vicinity of both of the edges 10t on the outer sides in the width direction of the annular structure 10d. A tire 1d illustrated in FIG. 19-2 has an arc 15d in the rubber layer 11 in the vicinity of both of the edges 10t on the outer sides in the width direction of the annular structure 10d. A tire 1e illustrated in FIG. 19-3 has a groove 15e in the rubber layer 11 in the vicinity of both of the edges 10t on the outer sides in the width direction of the annular structure 10d. The groove 15e included in the tire 1e has a smaller radial direction dimension on the outer side in the width direction compared with the groove 15c of the tire 1c illustrated in FIG. 19-1. The tires 1c, 1e, and 1d have the groove 15c, the groove 15e, and the arc 15d, respectively, and the ratio ta/tb thereof is within the range described above. Therefore, with the tires 1c, 1e, and 1d, both the reduction of the rolling resistance and the ensuring of the cornering power can be realized.

Figures 1, 20:
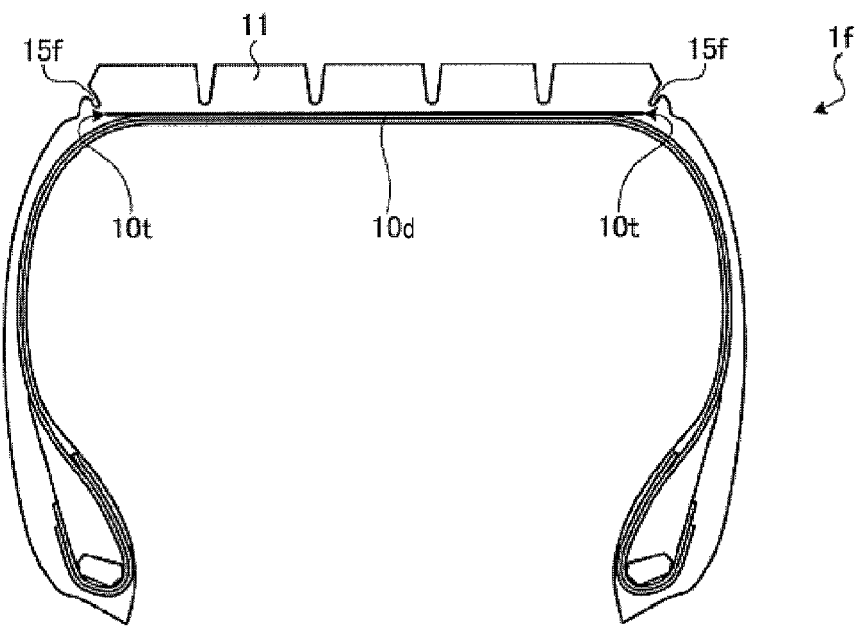
Figures 2, 20:
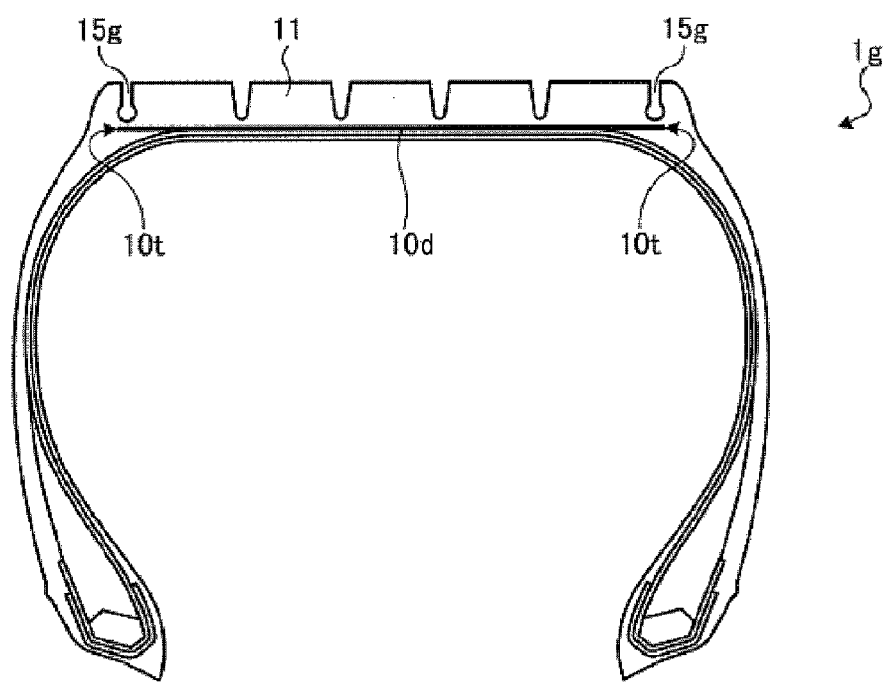

FIGS. 20-1 and 20-2 are meridian cross-sectional views illustrating examples where the tire according to this embodiment is applied to a TB tire. A tire 1f illustrated in FIG. 20-1 has a groove 15f in the rubber layer 11 in the vicinity of both of the edges 10t on the outer sides in the width direction of the annular structure 10d. The groove 15f is inclined with respect to an equatorial plane of the tire 1f and an opening portion thereof faces outward in the width direction. A tire 1g illustrated in FIG. 20-2 has a groove 15g in the rubber layer 11 in the vicinity of both of the edges 10t on the outer sides in the width direction of the annular structure 10d. A groove bottom portion of the groove 15g is larger than an opening portion thereof. The tires 1f and 1g have the grooves 15f and 15g, respectively, and the ratio ta/tb thereof is within the range described above. Therefore, with the tires 1f and 1g, both the reduction of the rolling resistance and the ensuring of the cornering power can be realized.

What is claimed is:

1. A pneumatic tire comprising:
   a cylindrical annular structure made from a metal material and having a thickness of more than 0.1 mm and not more than 0.8 mm;
   a rubber layer, which will become a tread portion, provided along a circumferential direction of the annular structure on an outer side of the annular structure; and
   a carcass portion including fibers covered with rubber, provided on at least both sides in a width direction of the cylindrical structure including the annular structure and the rubber layer; wherein
   a ratio ta/tb is not less than 0 and not more than 0.7, where ta is a smallest thickness of the rubber layer, in a direction orthogonal to a surface on the outer side in a radial direction or to an extended plane of the surface on the outer side in the radial direction of the annular structure, in a first region 10 mm outward in the width direction and 10 mm inward in the width direction centered on an edge on the outer side in the width direction of the annular structure;
   tb is a greatest thickness of the rubber layer, in a direction orthogonal to the surface on the outer side in the radial direction of the annular structure, in a second region that is a region more to an inner side in the width direction than the first region;
   the cylindrical annular structure does not contact the carcass portion in the first region and does contact the carcass portion in the second region; and
   a distance in a tire width direction from the edge of the cylindrical annular structure to an intersection point between the extended plane of the cylindrical annular structure and a tire side portion is larger than 10 mm.

2. The pneumatic tire according to claim 1, wherein, when the pneumatic tire is inflated to a predetermined air pressure, a contour form of a meridian cross-section of the tread portion comprises an arc, recessed toward an inner side of the pneumatic tire, in a region from an edge of the annular structure on the outer side in the width direction to 15 mm toward the outer side in the width direction.

3. The pneumatic tire according to claim 1, wherein, in a meridian cross-section, a shortest distance from the edge on the outer side in the width direction of the annular structure to a contour of the tread portion is not less than 0.5 mm and not more than 10 mm.

4. The pneumatic tire according to claim 1, wherein the annular structure is embedded in the rubber layer and is not exposed from a surface on the outer side in the radial direction of the rubber layer.

5. The pneumatic tire according to claim 1, wherein an outer side of the rubber layer and the outer side of the annular structure, except a groove portion of the rubber layer, are parallel to a center axis.

6. The pneumatic tire according to claim 1, wherein the annular structure comprises a metal material with a tensile strength of not less than 800 N/m$^2$ and not more than 2,300 N/m$^2$.

7. The pneumatic tire according to claim 1, wherein:
when the pneumatic tire is used as a passenger car tire, a pressure resistance parameter is not less than 250 and not more than 950, the pressure resistance parameter being a product of a tensile strength (MPa) and a thickness (mm) of the annular structure;
when the pneumatic tire is used as a light truck tire, the pressure resistance parameter is not less than 350 and not more than 1,100; and
when the pneumatic tire is used as a truck/bus tire, the pressure resistance parameter is not less than 600 and not more than 1,600.

8. The pneumatic tire according to claim 1, wherein the annular structure comprises through-holes, a cross-sectional area of one of the through-holes being not less than 0.15 mm$^2$ and not more than 70 mm$^2$.

9. The pneumatic tire according to claim 8, wherein a form of the through-holes is circular or elliptical, and an equivalent diameter $4 \times A/C$ of the through-holes, where C is a circumferential length of the through-holes, and A is an opening area of the through-holes, is not less than 1.0 mm and not more than 8.0 mm.

10. The pneumatic tire according to claim 8, wherein a sum of an opening area of the through-holes is not less than 1.5% and not more than 15% of a surface area of the outer side in the radial direction of the annular structure.

11. The pneumatic tire according to claim 1, wherein:
an elastic modulus of the annular structure is not less than 80 GPa and not more than 230 GPa; and
a product of the elastic modulus and the thickness of the annular structure is not less than 15 and not more than 400.

12. The pneumatic tire according to claim 1, wherein the rubber layer includes a groove in vicinity of the edges on the outer sides in the width direction of the annular structure.

* * * * *